(No Model.)
G. G. CROWELL.
TOOL FOR DRESSING ABRASIVE SURFACES.
No. 410,581. Patented Sept. 10, 1889.
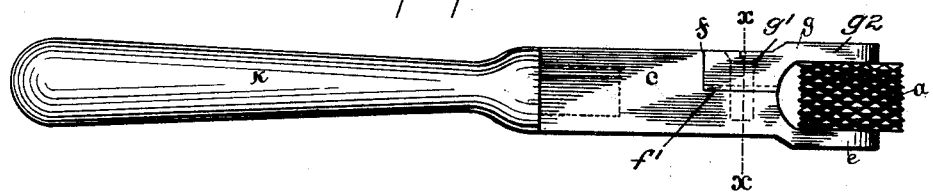
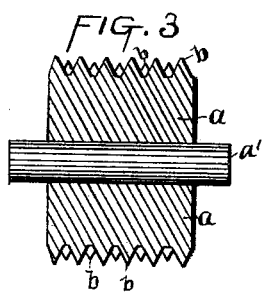
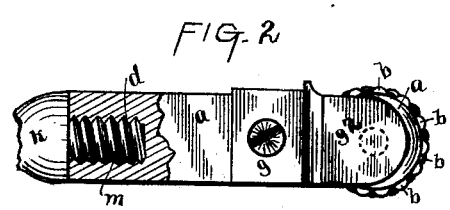
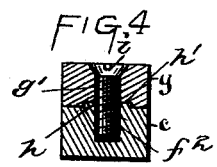
WITNESSES:
Barton Griffith
Clyde D. Lee
INVENTOR
George G. Crowell
BY C. C. Shepherd.
ATTORNEY

UNITED STATES PATENT OFFICE.

GEORGE G. CROWELL, OF CINCINNATI, OHIO.

TOOL FOR DRESSING ABRASIVE SURFACES.

SPECIFICATION forming part of Letters Patent No. 410,581, dated September 10, 1889.

Application filed February 27, 1889. Serial No. 301,343. (No model.)

*To all whom it may concern:*

Be it known that I, GEORGE G. CROWELL, a citizen of the United States, residing at Cincinnati, in the county of Hamilton and State of Ohio, have invented a certain new and useful Improvement in Tools for Dressing Abrasive Surfaces, of which the following is a specification.

My invention relates to the improvement of tools for turning or dressing emery-wheels or other abrading-tools; and the objects of my invention are to provide a durable and effective form of cutting or dressing wheel for a tool of this class, to so form the same as to greatly facilitate the dressing of emery-wheels, grindstones, and other similar grinding-surfaces, and to so construct and support said tool as to admit of its being used by hand or in a lathe. These objects I accomplish in the manner illustrated in the accompanying drawings, in which—

Figure 1 is a plan view of my improved tool. Fig. 2 is a side elevation of the tool-head, showing a portion of the shank broken away. Fig. 3 is a vertical sectional view of the cutting-wheel, and Fig. 4 is a transverse view of the tool-shank, taken on the line $x\,x$ of Fig. 1.

Similar letters refer to similar parts throughout the several views.

$a$ represents the cutter or dresser wheel, having formed on its periphery sharpened projections of peculiar form and arrangement. These cutting-edges or projections are formed by producing on the periphery of the wheel both a right and left inverted V-shaped thread at the same or different declinations. The V-shaped channels between these threads intersecting the latter at intervals will result in the division of the threads into rows of projecting teeth or blades $b$, the sharp outer edges of each of said teeth semicircular or approximately upon the arc of a circle.

$c$ represents a shank or stem, consisting of an oblong metallic piece having its rear end provided with a screw-hole $d$, and having its forward end cut away to form a recess $f'$, having a rear shoulder $f$, said shank beyond the recess terminating in an offset bearing-arm $e$.

$g$ represents a section of a contour adapting the same to fit the recess $f'$, the rear wall of the clamping-section abutting against the shoulder of the recess, and having its front end offset to form a bearing-arm $g$, oppositely disposed to and in line with the bearing-arm $e$. The clamping-section $g$ is provided with a perforation $g'$, which registers with a corresponding opening $f^2$ in the bottom of the recess $f'$, and through the perforation and into the opening is inserted a binding-screw $i$. The bottom of the recess $f'$ is provided with a rib $h$, and the under surface of the clamping-section is provided with a corresponding recess $h'$, for the reception thereof, said recess and rib, the screw, and the abutting shoulder combining to form a very rigid connection between the clamping-section and shank. The forward portion of each of the arms $e$ and $g$ is provided on its inner side with a shaft-bearing socket, (indicated by dotted lines in Fig. 2 of the drawings.)

Between the bearing-arms of the sections $c$ and $g$ is pivotally supported the dressing-wheel $a$, the central shaft $a'$ of the latter, on which said cutter is loosely mounted, bearing loosely within the sockets of said bearing-arms.

$k$ represents a handle, having on its forward end a projecting screw $m$, which is adapted to enter, as shown, the screw-hole $d$ of the shank.

From the construction above described it will be seen that the cutting-wheel $a$ may be held by hand, in the usual manner, against the surface to be dressed, or that the handle $k$ may be detached from the shank and the latter supported in the tool-post of a lathe.

It will be observed that by the peculiar formation of the wheel $a$ a superior cutting or dressing surface is produced.

It will also be seen that the cutting points or lines, being at different or the same declinations and constantly changing, serve the double purpose of embedding themselves into the matrix or abrading-wheel, at the same time crowding or removing the particles of abrading substance from their fastenings.

Having now fully described my invention, what I claim, and desire to secure by Letters Patent, is—

1. In a tool of the class described, the shank $c$, the forward end of which is cut away to form the recess $f'$, terminating in the rear abutting shoulder $f$, and the front offset bearing-arm $e$, in combination with the clamping-section $g$, fitting the recess $f'$ and having its rear end abutting against the shoulder $f$, and its forward end offset to form the bearing-arm $g^2$, and the binding-screw $i$, inserted through the clamping-section and terminating in the bottom of the recess $f'$, and the wheel $a$, mounted for rotation between the bearing-arms, substantially as specified.

2. In a tool of the class described, the shank $c$, cut away at its front end, forming the shoulder $f$ and recess $f'$, and beyond the recess offsetted to form the perforated bearing-arm $e$, and having the bottom of its recess provided with a rib $h$ and threaded opening $f^2$, in combination with the clamping-section $g$, mounted in and fitting the recess, and having its rear end abutting against the shoulder $f$, perforated, as at $g'$, and grooved, as at $h'$, to receive the rib, and extended to form a forward offset bearing-arm $g^2$, agreeing with the arm $e$, the screw $i$, inserted through the perforations $g'$ and $f^2$, and the wheel $a$, mounted in the bearing-arms, substantially as specified.

GEORGE G. CROWELL.

In presence of—
C. D. LEE,
C. C. SHEPHERD.